Nov. 12, 1963     D. B. CARTER     3,110,569
REMOVAL OF ARSENIC FROM REFORMER FEED
Filed Feb. 5, 1958     2 Sheets-Sheet 1
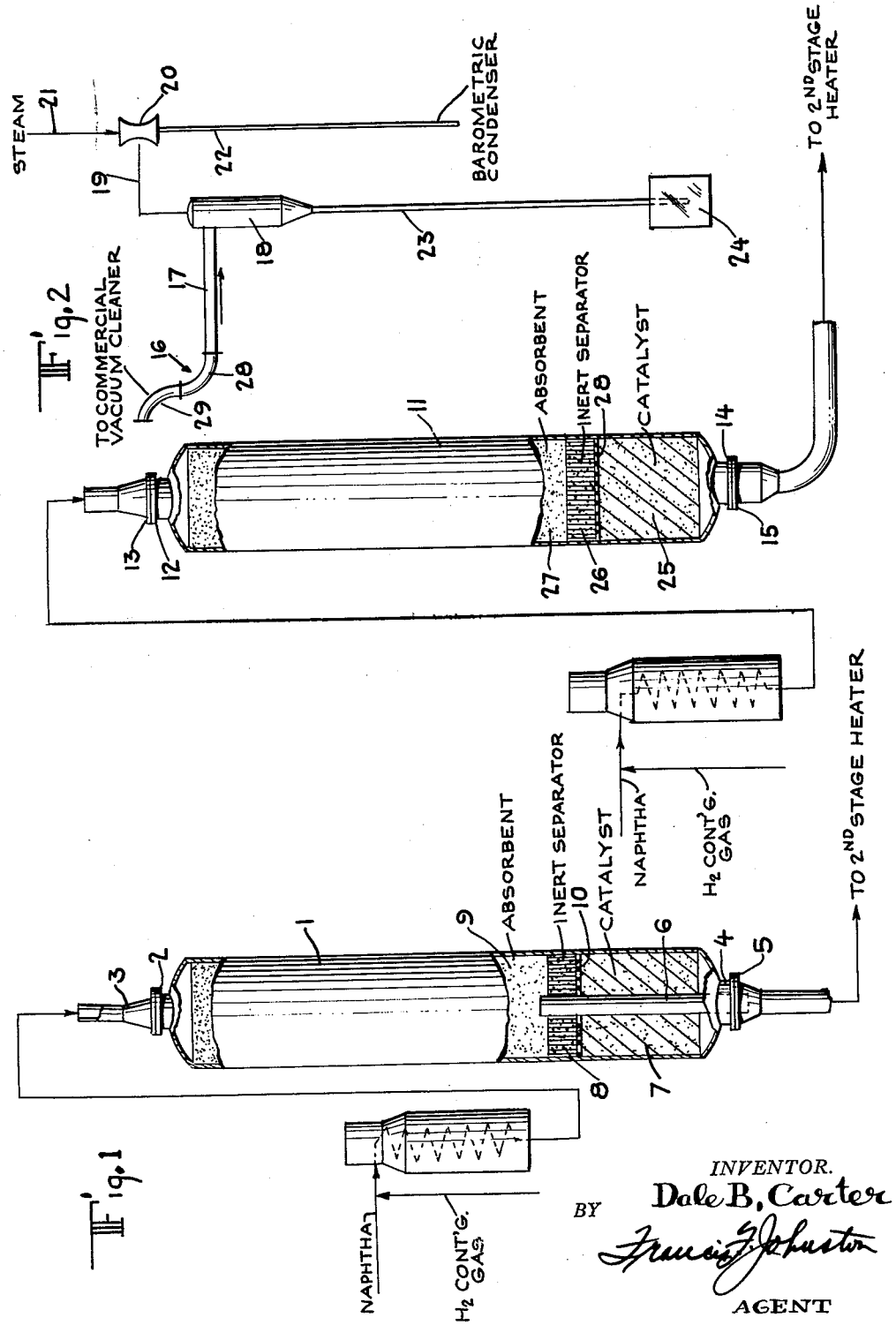
INVENTOR.
Dale B. Carter
BY
AGENT

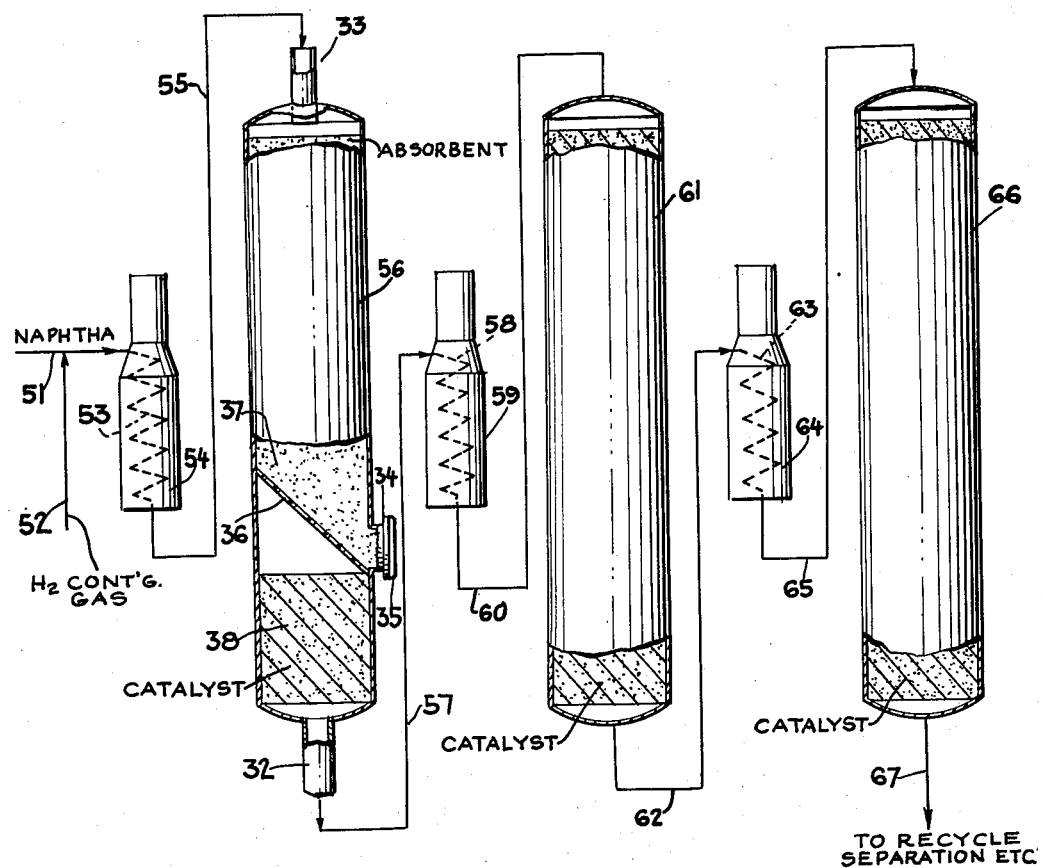

United States Patent Office 3,110,569
Patented Nov. 12, 1963

3,110,569
REMOVAL OF ARSENIC FROM REFORMER FEED
Dale B. Carter, Augusta, Kans., assignor to Socony Mobil Oil Company, Inc., a corporation of New York
Filed Feb. 5, 1958, Ser. No. 713,431
1 Claim. (Cl. 23—288)

The present invention relates to the removal of arsenic from the charge to a catalytic reformer employing an arsenic-sensitive particle-form solid reforming catalyst and, more particularly, to means for converting a reformer into a unit for the removal of arsenic and partial reforming of a naphtha charge stock.

The catalysts employed for reforming naphtha when reforming first was employed as a means of producing aromatic hydrocarbons from petroleum for use as such or as a gasoline having a high anti-knock rating appear to have been insensitive to arsenic compounds. However, with the increased demand for gasolines having a high octane or anti-knock rating platinum-type catalysts displaced the old base metal reforming catalysts. Recently it has been found that although the charge naphtha to a reforming unit employing a platinum-type, particle-form solid reforming catalyst had a concentration of sulfur compounds so low as to obviate pretreatment to remove sulfur nevertheless the activity of the catalyst was reduced. Investigation of the rapid decline of the activity of the catalyst revealed the fact that arsenic in concentrations greater than 1 p.p.b. (one part per billion) poisoned the platinum-type catalyst and seriously reduced the on-stream time between regenerations.

It was known that contacting naphtha containing sulfur and arsenic with a hydrogenating and desulfurizing catalyst such as a mixture of oxides of cobalt and molybdenum in the presence of hydrogen reduced the arsenic content of the naphtha to tolerable levels. On the other hand, many platinum-type reforming units had been designed to reform raw naphtha, i.e., naphtha which had not been hydrogenated and desulfurized. Consequently, it was necessary to find a cheaper means of reducing the arsenic content of the feed naphtha than by hydrogenation. This led to the discovery that arsenic can be removed from naphtha by contact with a solid absorbent such as fuller's earth, particularly absorbents containing oxides or salts of iron, copper, nickel and other metals which react with arsenic to form compounds which are not volatile at temperatures below about 1000° F.

Recently, it has been discovered that when reforming naphtha to produce gasoline having an octane rating (Research+3 cc. TEL) of 100 or more in a plurality of adiabatic reactors with reheating of the reactor effuent to reaction temperature intermediate successive reactors, it is advantageous to contact the naphtha in the first stage or reactor with the minimum amount of platinum-type catalyst required to produce a maximum temperature drop between the reactor inlet temperature of the vapors and the autogenous quench point as defined and disclosed in the co-pending application Serial No. 682,361, filed September 6, 1957, now U.S. Patent No. 2,946,737, in the name of Anthony E. Potas. As a consequence, many reforming units designed to employ a given amount of catalyst distributed equally among two or more adiabatic reactors must now be redesigned with respect to the first reactor to operate with about 18 to 20 percent as much catalyst as originally provided.

Removal of a portion of the catalyst to leave the required 18 to 20 percent of the original charge of catalyst in the first reactor does not solve the problem. When naphtha vapors pass through the void formerly occupied by catalyst thermal effects are deleterious. Thus, it becomes necessary to replace the undesirable portion of the catalyst in the first stage or reactor with an inert material such as fused silica. Thus, as disclosed in the aforesaid co-pending application Serial No. 682,361, the lower part of the first reactor is filled with inert material such as fused silica and the minimum amount of platinum-type catalyst required to produce the maximum temperature drop between the vapor inlet temperature and the temperature of the autogenous quench point is placed in the upper part of the first reactor. As a consequence, the vapors of the naphtha charge stock contact the platinum-type catalyst first and contact the inert filling material at a temperature below the temperature of the autogenous quench point.

The foregoing method of reforming naphtha over platinum-type catalyst in which a charge naphtha having concentrations of sulfur, nitrogen, and arsenic compounds which are tolerated by the platinum-type catalyst is contacted first with the platinum-type catalyst and then with inert material in a first stage or reactor and the effluent from the first stage or reactor is contacted with platinum-type catalyst in at least one additional stage or reactor with heating of the reactor effluent to reaction temperature between successive reactors is in direct contrast to the present method of treating a charge naphtha containing more than 1 p.p.b. of arsenic with or without concentrations of sulfur and nitrogen compounds deleterious to the activity and/or selectivity of platinum-type catalysts.

In accordance with the principles of the present invention the charge naphtha containing not more than about 500 p.p.m. (parts per $10^6$) of sulfur, and not more than about 5 p.p.m. (parts per $10^6$) of nitrogen and containing more than about 1 p.p.b. (part per $10^9$) of arsenic is contacted with an absorbent such as fuller's earth, Attapulgus clay, and the like in the presence of hydrogen at temperatures of about 800° to about 1000° F. and without reheating contacted with platinum-type reforming catalyst in the first stage. Preferably, where the reforming unit was designed and has been operated with two or more reactors each containing substantially the same amount of platinum-type reforming catalyst which amount in the first reactor of the series is greater than the minimum amount of said platinum-type reforming catalyst required to produce a maximum temperature differential between the vapor inlet temperature and the quench point, the first reactor is modified to provide means for contacting the naphtha containing not more than about 500 p.p.m. of sulfur and/or not more than about 5 p.p.m. of nitrogen and containing more than about 1 p.p.b. (parts per $10^9$) of arsenic with an absorbent of the aforesaid type and thereafter contacting the treated naphtha with platinum-type reforming catalyst in a minimum amount to provide a maximum temperature difference between the vapor inlet temperature and the temperature of the autogenous quench point.

FIGURE 1 is a vertical section of a reactor for contacting naphtha containing more than 1 p.p.b. (part per $10^9$) of arsenic with or without deleterious amounts of sulfur and/or nitrogen with a solid absorbent such as fuller's earth in the presence of hydrogen at a temperature within the range of about 800° F. and about 1000° F. followed by contact with an arsenic-sensitive catalyst such as a platinum-type reforming catalyst at reforming temperatures, pressure and space velocity without heating of the naphtha and hydrogen intermediate the solid absorbent and the reforming catalyst. It will be noted that provision is made to draw-off solid absorbent without withdrawing the reforming catalyst;

FIGURE 2 is a vertical section of a reactor similar to that illustrated in FIGURE 1 from which the solid absorbent is removed when desired by means of a vacuum cleaner connected with a steam eductor; and FIGURE 3 is a vertical section of a reactor similar to that illustrated in FIGURES 1 and 2 wherein provision is made for a side draw-off of solid absorbent. FIGURE 3 also provides a flow-sheet illustrative of the present method of removing arsenic compounds from a naphtha feed and reforming the naphtha feed containing not more than 1 p.p.b. (part per $10^9$) of arsenic over an arsenic-sensitive reforming catalyst without reheating the charge mixture of naphtha and hydrogen intermediate the bed of absorbent and the first reforming stage.

As disclosed in the co-pending application for United States Letters Patent Serial No. 682,361 the minimum amount of platinum-type reforming catalyst required to produce a maximum difference between the inlet temperature of the vapors to the first reforming stage and the temperature of the autogenous quench point is about 2 to about 5 tons per 10,000 barrels of charge naphtha per day.

It has been found that the concentration of arsenic in a charge naphtha containing about 20 p.p.b. (parts per $10^9$) can be reduced to not more than about 1 p.p.b. (part per $10^9$) by contacting the charge naphtha in the presence of hydrogen at temperatures of about 800° to about 1000° F., with a solid absorbent such as fuller's earth or Attapulgus clay at the rate of about 3 to about 6 tons of solid absorbent per 10,000 barrels of naphtha charge per day. Accordingly, a reactor is provided with a bottom bed of arsenic-sensitive particle-form solid reforming catalyst containing the minimum amount of said reforming catalyst to produce a maximum difference between the inlet temperature of the charge mixture of naphtha and hydrogen-containing gas and the temperature of the autogenous quench point. The reactor preferably is provided with a screen or other means of separating the catalyst bed from an intermediate bed of inert material such as fused silica. The inert material is in fragments, preferably in the form of spheres at least 0.25 inch in diameter and is for the purpose of avoiding plugging of the bed separating member or screen with finely divided solid absorbent. The inert material is any material which is chemically inert in the reforming reaction having sufficient strength to obviate extensive packing and concomitant increase in back-pressure. Above the bed of fragments or pellets of inert material is placed the bed of finely divided solid absorbent.

In the structure illustrated in FIGURE 1, the spent solid absorbent is withdrawn by removing reducer 5 and allowing the solid absorbent to flow from the bed of absorbent downwardly through discharge pipe 6 to a suitable means (not shown) for transporting the spent absorbent to regeneration, other use, or disposal.

The reactor illustrated in FIGURE 2 contains a bed of arsenic-sensitive particle-form solid reforming catalyst 25, a bed of finely divided solid absorbent such as fuller's earth 27 and an intermediate bed of inert material 26. Preferably, the intermediate bed is separated from the catalyst bed in any suitable manner as by a screen 28.

The spent, finely divided solid absorbent is removed from the reactor by means of a "vacuum cleaner" of industrially practical size several of which are available as articles of commerce. The vacuum cleaner is attached by means of a flexible conduit to unit 16 which can be of any type permitting movement of the vacuum cleaner head to reach all parts of the bed of solid absorbent. As illustrated, unit 16 comprises two rotatably mounted elbows 28 and 29. One elbow is rotatably mounted on conduit 17 and the other 29 is rotatably mounted on elbow 28. Conduit 17 is attached to cyclone 18 from which gases are drawn through conduit 19 by steam eductor 20. Steam is introduced into eductor 20 through conduit 21. The steam is condensed in barometric condenser 22. The particles of solid absorbent withdrawn from the reactor through the cleaner and conduit 17 separate from the gases in cyclone 18 and flow therefrom through conduit 23 to receiver 24.

In FIGURE 3 is illustrated a reactor having a first bed of finely divided solid absorbent 37, a bed separating member such as a screen 36 and a manway 34 having a closure member such as a plate 35 sealing manway 34. Screen 36 is disposed in the reactor with the lower end thereof not lower than the lower side of manway 34 and inclined to the opposite side of the reactor at an angle greater than the angle of repose of the solid absorbent material.

The flow of naphtha containing more than 1 p.p.b. (part per $10^9$) of arsenic and hydrogen through the bed of finely divided absorbent and arsenic-sensitive catalyst in the first of a plurality of adiabatic reactors is substantially the same whether the reactor be one such as illustrated in FIGURE 1 or FIGURE 2 or FIGURE 3. Consequently, discussion of the flow of vapors through a plurality of reactors in which in a first stage the naphtha containing more than 1 p.p.b. (part per $10^9$) of arsenic is contacted with finely divided solid absorbent material such as fuller's earth in the presence of hydrogen at a temperature within the range of about 800° to about 1000° F. to produce an absorbent effluent comprising hydrocarbons boiling in the gasoline range containing not more than 1 p.p.b. (part per $10^9$) of arsenic, hydrogen, and hydrocarbons boiling below the gasoline range, contacting in a second stage the absorbent effluent with arsenic-sensitive particle-form solid reforming catalyst under reforming conditions of temperature, pressure, and space velocity to produce gasoline having the required octane rating, reheating the effluent from the second reforming stage to a reforming temperature and contacting the reheated second stage effluent with particle-form solid reforming catalyst as many times as required to produce gasoline having the required octane rating while reheating the effluent from each stage except the last to reforming temperature before contacting the effluent with the reforming catalyst in the next successive stage.

The flow-sheet of FIGURE 3 illustrates the preferred form of the invention in which the bed of absorbent and the bed of arsenic-sensitive reforming catalyst are in the same container. The preferred reforming catalyst is a platinum-type catalyst comprising about 0.1 to about 2 percent of platinum on a carrier of alumina. The preferred form of the invention provides for 2 to 5 tons of said platinum-type catalyst per 10,000 barrels of naphtha charged per day in the second stage or first reforming stage and an amount of catalyst in one or more other adiabatic reactors sufficient to produce gasoline having the required octane.

Naphtha is pumped from a source not shown at slightly above reactor pressure of at least about 100 p.s.i.g. through conduit 51. Hydrogen-containing gas containing at least 75 percent hydrogen, preferably recycle gas, pumped by a compresosr from a liquid-gas separator not shown flows through conduit 52 to conduit 51. In conduit 52 the hydrogen-containing gas is mixed with the charge naphtha containing more than 1 p.p.b. (part per $10^9$) and not bore than about 30 p.p.b. (parts per $10^9$) of arsenic in the ratio of about 6–10 mols of hydrogen per mol of naphtha to form a charge mixture.

The charge mixture flows through conduit 51 to coil 53 in heater 54. In heater 54 the charge mixture is heated to a reforming temperature within the range of about 800° to about 1000° F. dependent upon the activity of that catalyst, the required octane rating of the gasoline to be produced and other factors well-known to those skilled in the art.

The heated charge mixture flows from heater 54 through conduit 55 to reactor 56. Preferably, the heated charge mixture is introduced into reactor 56 at the top thereof although the charge mixture can be introduced into reactor 56 at the bottom thereof. The charge mixture comprising naphtha containing more than 1 p.p.b. (part per $10^9$) of arsenic and recycle gas in the ratio of about 6 to 10 mols of hydrogen per mol of naphtha flows downwardly through the bed of absorbent 37 at a temperature not less than a reforming temperature. The effluent containing not more than 1 p.p.b. of arsenic from the bed of solid absorbent flows without reheating downwardly through the bed of platinum-type catalyst 38 to effluent outlet 32.

From effluent outlet 32 the mixture of hydrogen and hydrocarbons flows through conduit 57 to coil 58 in heater 59. In heater 59 the first reforming stage effluent is heated to a reforming temperature dependent upon the variables set forth hereinbefore. From heater 59 the first reforming stage effluent flows through conduit 60 to reactor 61.

The reheated first reforming stage effluent flows downwardly through arsenic-sensitive platinum-type particle-form reforming catalyst to conduit 62 through which the second reforming stage effluent flows to coil 63 in heater 64.

In coil 63 the second reforming stage effluent is heated to a reforming temperature dependent upon the variables enumerated hereinbefore. From heater 64 the reheated second reforming stage effluent flows through conduit 65 to reactor 66.

In reactor 66 the reheated second reforming stage effluent flows downwardly in contact with arsenic-sensitive particle-form platinum-type reforming catalyst. The third reforming stage effluent flows from reactor 66 to means for separating hydrogen-containing recycle gas from $C_{4+}$ hydrocarbons and means for stabilizing, fractionating and admixing additives with the reformed gasoline.

The foregoing discussion of a preferred form of the present invention is a description of a method for removing arsenic from naphtha to be reformed and reforming the treated naphtha in the presence of arsenic-sensitive particle-form reforming catalyst wherein the charge naphtha containing more than 1 p.p.b. (part per $10^9$) but not more than 30 p.p.b. (parts per $10^9$) of arsenic is contacted with a solid absorbent at reforming temperatures in the presence of hydrogen and without heating the absorbent bed effluent (containing not more than 1 p.p.b. (part per $10^9$) of arsenic as compounds boiling in the gasoline boiling range) is contacted in the presence of arsenic-sensitive particle-form reforming catalyst in the presence of hydrogen passed through said bed of absorbent under reforming conditions of temperature, pressure and space velocity.

I claim:

An apparatus for removing arsenic from and dehydrogenating naphtha which comprises a first vertical cylinder having a top and a bottom, a vapor inlet in the region of said top, and a vapor outlet in said bottom concentric with the vertical axis of said first cylinder, a horizontal vapor permeable adsorbent retaining plate movably mounted in said first cylinder and spaced from said bottom of said first cylinder a distance greater than the depth of a static bed of particle-form reforming catalyst having a volume equal to 3 to 5 tons of said reforming catalyst per 10,000 barrels of naphtha feed per day and the distance between said permeable plate and said vapor inlet being greater than the depth of a static bed of finely divided adsorbent having a volume equal to about 3 to 6 tons per 10,000 barrels of naphtha feed per day, an inner vertical cylinder having a diameter not more than 10 inches, said inner cylinder extending downwardly within said vapor outlet and extending upwardly within said first cylinder above the plane of the upper surface of the aforesaid horizontal plate, said inner cylinder being adapted for the intermittent removal by the force of gravity of said finely divided adsorbent from said static bed of finely divided adsorbent.

References Cited in the file of this patent
UNITED STATES PATENTS

| | | |
|---|---|---|
| 2,779,715 | Murray et al. | Jan. 29, 1957 |
| 2,781,297 | Appell | Feb. 12, 1957 |
| 2,791,544 | Eastwood | May 7, 1957 |
| 2,800,428 | Hengstebeck | July 23, 1957 |
| 2,875,150 | Schuman | Feb. 24, 1959 |